United States Patent
Johnson

(10) Patent No.: US 6,751,717 B2
(45) Date of Patent: Jun. 15, 2004

(54) METHOD AND APPARATUS FOR CLOCK SYNCHRONIZATION BETWEEN A SYSTEM CLOCK AND A BURST DATA CLOCK

(75) Inventor: Brian Johnson, Boise, ID (US)

(73) Assignee: Micron Technology, Inc., Boise, ID (US)

(*) Notice: Subject to any disclaimer, the term of this patent is extended or adjusted under 35 U.S.C. 154(b) by 67 days.

(21) Appl. No.: 09/767,490

(22) Filed: Jan. 23, 2001

(65) Prior Publication Data

US 2003/0172240 A1 Sep. 11, 2003

(51) Int. Cl.$^7$ ............................................. G06F 12/00
(52) U.S. Cl. ...................... 711/167; 711/168; 711/169; 710/5; 710/20; 710/52; 710/58
(58) Field of Search ................................ 711/167, 168, 711/169; 710/5, 6, 52, 58

(56) References Cited

U.S. PATENT DOCUMENTS

| | | | | |
|---|---|---|---|---|
| 5,327,019 A | * | 7/1994 | Kluck | 327/202 |
| 5,794,019 A | | 8/1998 | Genduso et al. | |
| 5,822,571 A | * | 10/1998 | Goodrum et al. | 713/400 |
| 5,844,859 A | | 12/1998 | Iwamoto et al. | |
| 5,895,482 A | | 4/1999 | Toda | |
| 5,950,219 A | * | 9/1999 | Rao | 711/5 |
| 5,966,724 A | * | 10/1999 | Ryan | 711/105 |
| 6,047,334 A | * | 4/2000 | Langendorf et al. | 710/5 |
| 6,101,136 A | * | 8/2000 | Mochida | 365/194 |
| 6,279,116 B1 | * | 8/2001 | Lee | 713/601 |
| 6,366,150 B1 | * | 4/2002 | Ishimi | 327/276 |
| 6,427,196 B1 | * | 7/2002 | Adiletta et al. | 711/158 |
| 6,449,679 B2 | * | 9/2002 | Ryan | 710/315 |
| 6,604,179 B2 | * | 8/2003 | Volk et al. | 711/167 |

OTHER PUBLICATIONS

Brian Johnson, "Method and Apparatus for Address FIFO for High–Bandwidth Comman/Address Busses in Digital Storage System", Figures 1–9, Apr. 3, 2000, Application for Letters Patent, USPTO.

* cited by examiner

*Primary Examiner*—Donald Sparks
*Assistant Examiner*—Ngoc Dinh
(74) *Attorney, Agent, or Firm*—Thorp Reed & Armstrong, LLP

(57) ABSTRACT

The present invention coordinates the execution of commands, received in response to a continuous system clock, with the receipt of data in response to a burst clock. Command capture logic receives command information in response to the system clock. A storage element is responsive to the command capture logic for storing certain command information such as write commands. A two stage pipeline receives the command information from the storage element in response to the burst clock and outputs the command information in response to the system clock. Methods of operating the apparatus are also disclosed.

51 Claims, 4 Drawing Sheets

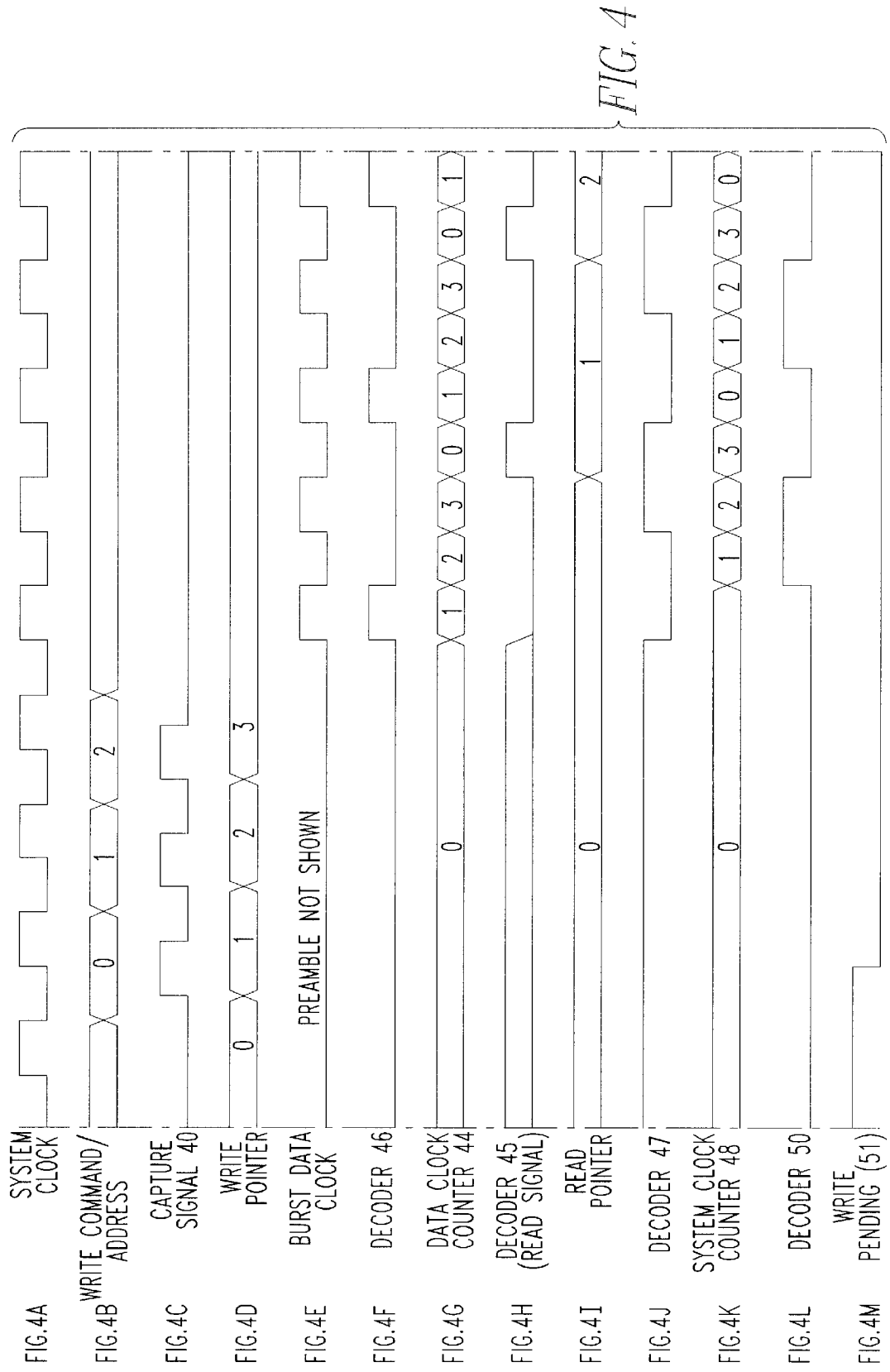

METHOD AND APPARATUS FOR CLOCK SYNCHRONIZATION BETWEEN A SYSTEM CLOCK AND A BURST DATA CLOCK

BACKGROUND OF THE INVENTION

1. Field of the Invention

The present invention is directed to methods and apparatus for transferring control between clock domains and, more particularly, to a method and apparatus for enabling the transfer of control between a free running system clock and a burst, source-synchronous, data clock.

2. Description of the Background

Microprocessor have made substantial advances in terms of speed of operation and the number of instructions that can be performed per second. In fact, the speed of operation of microprocessors is outpacing the speed of operation of memory devices such that it is necessary to have many memory devices responsive to a single processor in an effort to ensure that instructions and data are provided to the processor at a speed as close to the operating speed of the processor as possible.

To address the need for faster devices, a group of devices can be placed on a common bus. In such a configuration, each device operates in a coordinated manner with other devices on the bus to share data which is transmitted at a high speed. An example of such a high speed data system is described in U.S. Pat. No. 5,917,760 to Millar. Millar describes a high speed data system using a common bus and a memory sub-system commonly known as SyncLink Dynamic Random Access Memory (SLDRAM). By providing an appropriate number of memory devices and an efficient control system as used in SLDRAM, very high speed data transmissions can be achieved. However, faster systems, such as SLDRAM, are now reaching transfer speeds where memory devices cannot process the data as fast as the common bus can supply it. More specifically, as data storage address commands arrive at a memory system, it the corresponding data has not yet arrived, the address commands must be stored in a data pipeline until the data arrives. This address command backlog prevents use of the data pipeline by other processes, including transmitting other data, until the data corresponding to the address command arrives. That inconsistency in arrival times for address commands and data can result in increased data errors and lost data, but most often slows the system by creating a bottleneck of address commands.

In a source synchronous memory system, a burst data clock is set coincident with data to provide a well-timed latching clock at the receiving end of a data bus. If data capture latency is high for write data, but command bus band width is also high, it may become necessary to store several write commands and addresses before the data associated with those commands and addresses is captured. A second problem associated with a source synchronous system using a burst data clock is that the burst clock only cycles for the time the data is being sent across the bus. That has implications for completing a write command using synchronous logic because the clock that is timed for the data is only present on the bus for data capture and becomes unavailable for bother logic operations. That situation is outlined in the timing diagram of FIG. 1. As seen from FIG. 1, a write command is taken from the command bus in response to a continuous, free-running, system clock. After some period of delay, labeled the latency period in FIG. 1, data can be taken off the data bus in response to a burst data clock. A problem arises as a result of the need to resynchronize the capture clock back to the free-running system clock so that the synchronous logic can complete the write operation through the control of the data path. FIG. 1 also illustrates the preamble of the burst clock, which comprises three low clock ticks before the first pulse of the clock signal, a receive enable signal $\overline{\text{Ren}}$ which transitions during the preamble, and the internal burst data clock U.S. Pat. No. 5,895,482 is entitled Data Transfer System For Transferring Data In Synchronization With System Clock and Synchronous Semi-Conductor Memory Disclosed therein is a data transfer system having a data transfer path divided into a number of pipeline stages. A control section controls the number of pipeline stages that are activated. U.S. Pat. No. 5,844,859 is entitled Synchronous Semi-Conductor Memory Device Reliably Fetching External Signal In Synchronization With Clock Signal Periodically Supplied From the Exterior. Disclosed therein is a method by which operating frequency is increased and CAS latency is set longer, and a data write end time is delayed by a specific time in response to the change in the CAS latency. By appropriate control of the time periods, a write period for second-bit data is ensured in an SDRAM even if the operation frequency is increased.

Despite attempts to solve the aforementioned problems, the need still exists for an apparatus and method for reliably capturing command and address information with a continuous clock, capturing data at a later time with a burst clock, and coordinating the execution of the command on the later received data with the continuous clock.

SUMMARY OF THE PRESENT INVENTION

The present invention is directed to an apparatus for coordinating the execution of commands with the receipt of data in response to a burst clock. Command capture logic receives command information in response to a system clock. A storage element is responsive to the command capture logic for storing certain command information such as write commands. A two stage pipeline receives the command information from the storage element in response to the burst clock and outputs the command information in response to the system clock.

The storage element may be implemented by a first in first out buffer (FIFO) responsive to both command and address information for storing the incoming write commands and associated address information. The two stage pipeline may include two delay elements, such as latches, controlled by two state counters. One state counter is clocked by the burst clock while the second state counter is clocked by the continuous clock. The data clock counter output is decoded to generate three control signals: a first signal for controlling the read side of the FIFO, a second signal for controlling the first stage of the pipeline, and a third signal to start the counter responsive to the continuous clock. The output of the counter responsive to the continuous clock is decoded and a control signal is generated to control the second stage of the pipeline and to initiate the generation of control signals to control the data path logic for executing the write command.

The method of the present invention is comprised of the steps of storing information, inputting the stored information into a pipeline in response to a burst clock, and outputting the information from the pipeline in response to a continuous clock.

The apparatus and method of the present invention accomplish the task of capturing and storing commands, such as write commands, and controlling the operation of the data path so that the write command can be executed at a later time after the corresponding data has arrived. The apparatus and method of the present invention also enable control to be shifted between the two clock domains. More specifically, control initially is with the continuous clock which is used to receive the write command and address information. Control is then transferred to the burst clock to enable the data to be received. Finally, control is transferred back to the continuous clock to enable the write command to be executed on the associated address using the later received data.

Those, and other advantages and benefits, will be apparent from the Description of the Preferred Embodiment appearing hereinbelow.

BRIEF DESCRIPTION OF THE DRAWINGS

For the present invention to be easily understood and readily practiced, the present invention will now be described, for purposes of illustration and not limitation, in conjunction with the following figures, wherein:

FIG. 4 is a timing diagram helpful in understanding the operation of the apparatus of FIG. 3.

DESCRIPTION OF THE PREFERRED EMBODIMENTS

Figure 2:
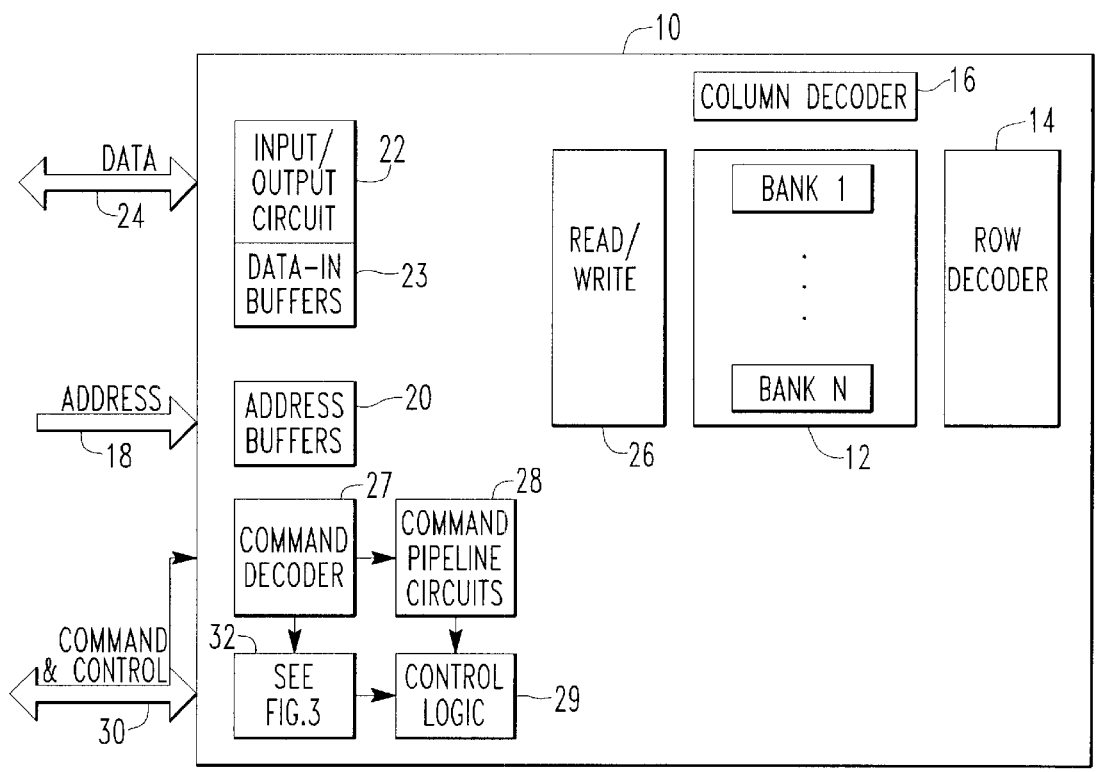
FIG. 2 is a block diagram of a memory device in which an apparatus enabling control to be transferred between two clock domains may be used.

The present invention will now be described in conjunction with FIG. 2 which illustrates a memory device 10. The reader will understand that the description of the present invention in conjunction with the memory 10 of FIG. 2 is merely for the purpose of providing one example of an application for the present invention. The present invention is not to be limited to the application shown if FIG. 2.

The memory device 10 includes, by way of example and not limitation, t synchronous dynamic random access memory device (SDRAM). As shown in FIG. 2, memory device 10 includes a main memory 12. Main memory 12 typically includes dynamic random access memory (DRAM) devices which include one or more memory banks, indicated by BANK 1–BANK N. Each of the memory banks BANK 1–N includes a plurality of memory cells arranged in an array of rows and columns. A row decoder 14 and a column decoder 16 access the rows and columns, respectively, in response to an address and thus form an address decoder. The address is provided on an address bus 18 by an external controller (not shown in FIG. 2), such as a microprocessor, and may be stored in one or more address buffers 20. An input/output circuit 22 is connect to a data bus 24 for bi-directional data communication with main memory 12 through a read/write circuit 26. The input/output circuit 22 includes data in buffers 23 for to receiving data to be written to the main memory 12. A command decoder 27 is responsive to a command and control bus 30. Command pipeline circuits 28 are responsive to command decoder 27 while control logic 29 is responsive to command pipeline circuits 28. The command decoder 27 decodes commands to distinguish read and write commands. Commands are transferred to the command pipeline circuits 28 which are a series of delay circuits. Circuits 28 are controlled by the command decoder 27 to provide latency values, synchronized to the system clock, for the particular circuit. Control logic 29 is responsive to command pipeline circuits 28 for generating signals for controlling the address decoder and the read/write circuit 26 to control the flow of data between the memory 10 and external devices. The control signals may include, but are not limited to, Chip Select (CS*), Row Access Strobe (RAS*), Column Access Strobe (CAS*), Write Enable (WE*), and Clock Enable (CKL).

The memory device 10 also includes an apparatus 32 constructed according to the teachings of the present invention for coordinating the execution of commands with receipt of data in the data in buffer 23. The apparatus 32 is described hereinbelow with reference to FIG. 3. Those skilled in the art will readily recognize that the memory device 10 of FIG. 2 is simplified to illustrate an application of apparatus 32 and is not intended to be a detailed description of all of the features of a memory device.

Figure 3:
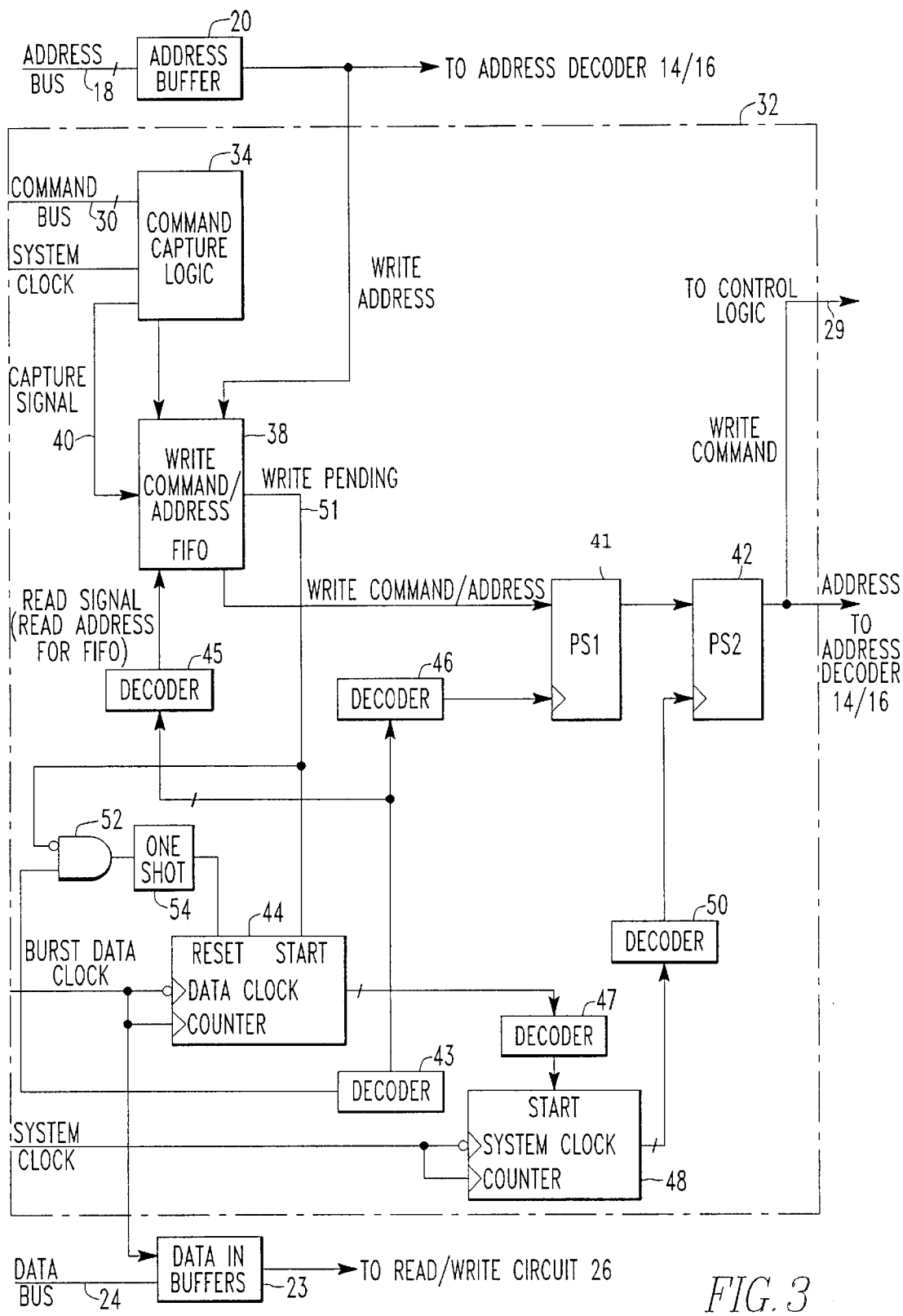
FIG. 3 is a block diagram of the apparatus of FIG. 2 in conjunction with certain components of the memory device of FIG. 2.

FIG. 3 is a block diagram of the apparatus 32 of FIG. 2 in conjunction with the address buffer 20 and the data in buffers 23 Because the burst data clock becomes unavailable after the data has been latched into data in buffers 23 from data bus 24, and further control of the data path must occur using synchronous logic, control must move between the two clock domains: from the system clock (which is a continuous clock) used for command capture, to the burst data clock for data capture, and then back to the continuous system clock for data processing in accordance with the write command. The data processing function cannot occur until after the data has been captured in data in buffers 23. Processing of a write command also requires a clock resynchronization from the burst data clock to the continuous system clock. The delaying of the processing of a write command coupled with the necessary clock resynchronization is accomplished by the apparatus 32.

Apparatus 32 is comprised of command capture logic 34. The command capture logic 34 is responsive to the command bus 30 and the continuous system clock. The command capture logic 34 partially decodes commands to determine if the commands are read or write commands. Read commands are ignored while write commands are input to a write command/address first-in first-out (FIFO) buffer 38. At the time that the write command is captured by FIFO 38, an address associated with the write command is also captured by the FIFO 38. The capturing of the write address with the write command in FIFO 38 is not particularly important as the write address may be handled in other ways, described below. However, in a preferred embodiment, both the write command and the write address are captured in FIFO 38 in response to a capture signal 40 produced by the command capture logic 34. The capture signal 40 is a synchronous signal timed to the system clock. The capture signal 40, generated by logic (not shown), partially decodes the column command to determine if the command is a read or write to the memory array.

The information in FIFO 38, which may include command and address information, is output from the FIFO 38 to a first pipeline stage element 41. A second pipeline stage element 42 is responsive to the first pipeline stage element 41. Information stored in FIFO 38 thus travels from FIFO 38, to first pipeline stage element 41, and from first pipeline stage element 41 to second pipeline stage element 42. That portion of the information that is a write command is forwarded to control logic 29. If address information is also included, the address information is input to the address decoder, which is comprised of row decoder 14 and column decoder 16. Those of ordinary skill in the art will recognize that many types of devices may be used to implement the elements 41 and 42, e.g. flip-flops, FIFO's, etc., depending upon the particular system architecture employed.

A first counter 44 is responsive to the burst data clock and may be referred to as the data clock counter. The data clock counter 44 produces a clock count from which it can be determined when associated write data has been captured and the next set of write command/address information is needed. The clock count is input to four separate decoder circuits, decoder 43, decoder 45, decoder 46, and decoder 47. Decoder 43 is responsive to one of the values of the clock count for purposes (discussed later) of resetting data clock counter 44. Decoder 45 is responsive to one of the values of the clock count to produce an output signal used to control the read side of write command/address FIFO 38. Decoders 46 and 47 are, likewise, each responsive to one of the values of the clock count to produce signals used to cause the first pipeline stage element 41 to latch in data and start a second clock counter 48, respectively.

The second clock counter 48 counts clock pulses of the continuous system clock. As stated, the system clock counter begins counting in response to a certain count of the data clock counter 44. A decoder 50 is responsive to a certain count of the system clock counter 48 to produce a signal causing the second pipeline element 42 to latch data.

According to a preferred embodiment, both of the counters 44 and 48 are double edge clock logic. That helps reduce the cycle latency through the apparatus 32 by allowing the decoders 43, 45, 46, 47 and 50 to output latch signals on either edge of the clock. Another reason for double-edge triggered logic is that there are cases where the phase relationship between the system clock and the burst data clock are unknown or change over voltage, temperature and process variations. For that reason, the apparatus 32 has a one-half clock cycle (of the system clock) uncertainty. It should be noted, however, that double edge counters are not required.

Another feature of the counters 44 and 48 is that the counters operate from a "start" signal. When "start" is valid, and a clock edge occurs, and the output is currently zero, the counter begins counting. When the counter reaches zero again, and the "start" signal is not asserted, the counter stops and stays at a value of zero. If the "start" signal is reasserted and the count is zero, the counter continues counting until the output is zero and "start" is not asserted. In the particular embodiment shown, the data clock counter 44 uses as its "start" signal a write pending signal 51. The write pending signal is also input to an AND gate 52 that receives the output of decoder 43. The output of AND gate 52 controls a one shot 54 that rests data clock counter 44 when write pending signal 51 is not asserted and the desired clock count is reached as indicated by decoder 43. Other methods of starting and resetting data clock counter 44 are possible; the disclosed method represents the presently preferred embodiment.

The write command/address FIFO 38 outputs the write pending signal 51 which indicates that pending writes have been loaded into the FIFO 38. The write pending signal 51 is not asserted if there is no pending write command loaded into the FIFO 38. Whether there is a pending write command is known by comparing the FIFO read pointer value with the write pointer value. If the pointer values are the same, then no write command is pending. At the end of the data burst counter sequence, the one shot 54 is operated to pulse the reset terminal of the data clock counter 44 assuming there are no pending write commands in FIFO 38. That assures that the data clock counter 44 always starts from the correct output state.

The data clock counter 44 may be of a type that has input buffers that are used to capture the external burst data clock and are responsive to a control signal that turns the input buffers on or off. If the input buffers are turned off, the circuits pull the internal burst data clock output to a logic low and there is no clock signal transition available even though the reset and start signals are in the correct state for starting the counter. The data clock counter 44 input buffers are turned on by an input buffer enabled signal that is generated according to the program data latency for all incoming write commands to the memory device 10.

Figure 1:
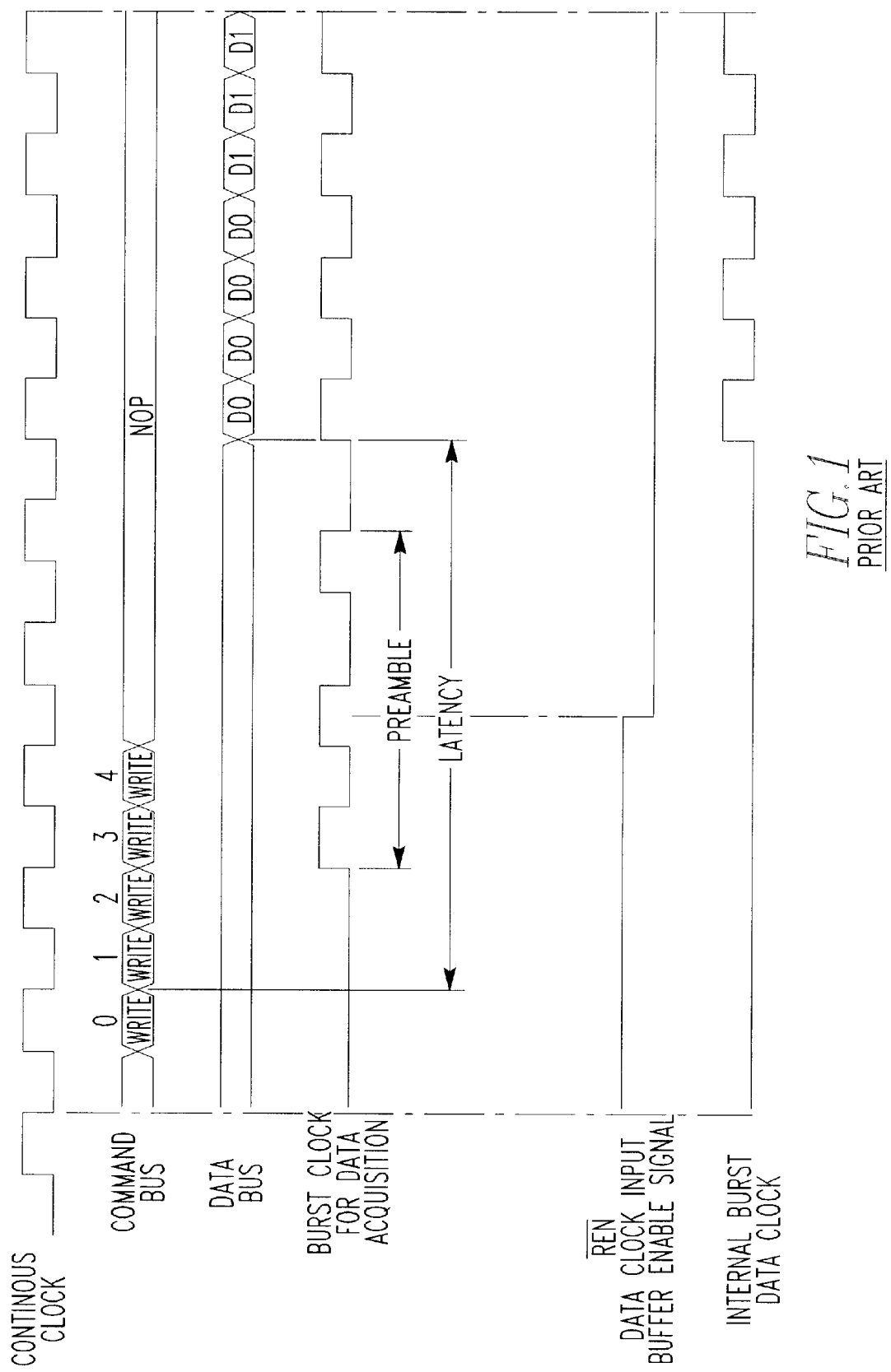
FIG. 1 is a timing diagram illustrating the receipt of command information in response to a continuous clock, the receipt of data in response to a burst clock, the delay (latency) between those two events, as well as other signals.

The input buffer enable signal turns on during the data clock preamble, (see FIG. 1 $\overline{Ren}$) so that the first rising edge of the data clock corresponds to the first data bit captured from the external data bus. The data clock input buffers, when turned off, actively pull the internal data clock signal low to insure that no false transitions of the external clock are detected while the external clock signal is in a tri-state condition. That is why the input buffer enable signal should go active only during the logic low preamble of the external clock for data acquisition. The data clock counter 44 begins counting with the first edge (rising) of the burst data clock.

By examining the timing diagrams of FIG. 4, it is seen that the write command addresses (FIG. 4B) are received and latched into FIFO 38 in response to the system clock (FIG. 4A). Sometime later (write latency), the burst data clock (FIG. 4E) is available and is used to capture data from the data bus 24 and store it in data in buffers 23. At the same time, the burst data clock counter 44 (FIG. 4G) begins counting each edge of the data clock. The decoder 45 (FIG. 4H) provides a read signal to read the current pointer location in the FIFO 38. Decoder 46 (FIG. 4F) provides a signal which is input to the first pipeline stage element 41 while decoder 47 (FIG. 4J) provides the start signal to the system clock counter 48. The system clock counter 48 produces a system clock count (FIG. 4K). The decoder 50 is responsive to the system clock count (FIG. 4K) to provide a signal (FIG. 4L) which is input to the second pipeline stage element 42.

FIG. 4M illustrates the write pending signal 51 which is the start signal for data clock counter 44. FIG. 4C illustrates the capture signal 40. The rising edge of the capture signal 40 increments the write pointer (FIG. 4D) while the falling edge triggers the FIFO 38 to capture information. On the output side of the FIFO 38, the read pointer (FIG. 4I) is incremented in response to the signal output by the decoder 45 (FIG. 4H). Through assertion of the read signal (FIG. 4H) by decoder 45, the information stored in FIFO 38 is moved from FIFO 38 to the first pipeline stage element 41. Assertion of the signal (FIG. 4F) by decoder 46 moves information from the first pipeline stage element 44 to the second pipeline stage element 42. Assertion of the signal (FIG. 4L) by the decoder 50 makes the information available at the output of the second pipeline stage element 42, with control information then being sent to the control logic 28 and address information being sent to the address decoder 14/16.

As previously mentioned, the address information may travel with the write command through the apparatus 32

Alternatively, a parallel path for the address information may be provided. In another alternative, the address information may be separately stored in another FIFO (not shown) which is read at the time the data is available and the write command has propagated through the apparatus 32. Additional pipeline stages may be added as needed.

Figure 5:
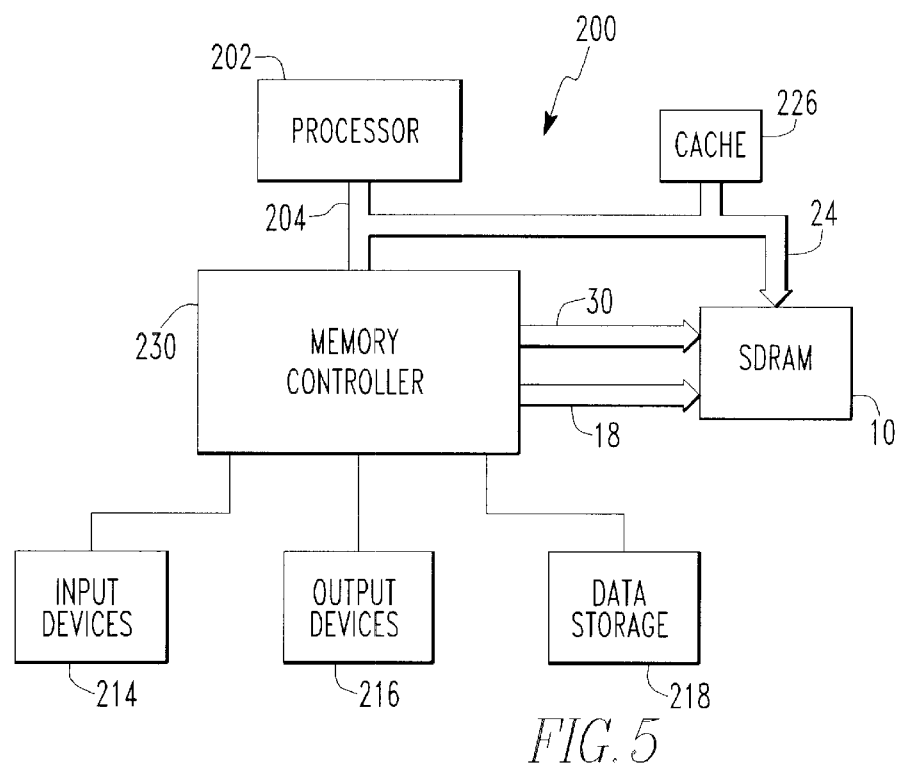
FIG. 5 is a block diagram of a system in which the memory device of FIG. 2 may be used.

FIG. 5 illustrates a computer system 200 containing the SDRAM 10 of FIG. 2 using the present invention. The computer system 200 includes a processor 202 for performing various computing functions, such as executing specific software to perform specific calculations or tasks. The processor 202 includes a processor bus 204 that normally includes an address bus, a control bus, and a data bus. In addition, the computer system 200 includes one or more input devices 214, such as a keyboard or a mouse, coupled to the processor 202 to allow an operator to interface with the computer system 200. Typically, the computer system 200 also includes one or more output devices 216 coupled to the processor 202, such output devices typically being a printer or a video terminal. One or more data storage devices 218 are also typically coupled to the processor 202 to allow the processor 202 to store data in or retrieve data from internal or external storage media (not shown). Examples of typical storage devices 218 include hard and floppy disks, tape cassettes, and compact disk read-only memories (CD-ROMs). The processor 202 is also typically coupled to cache memory 226, which is usually static random access memory ("SRAM") and to the SDRAM 10 through a memory controller 230. The memory controller 230 normally includes the command and control bus 30 and the address bus 18 that are coupled to the SDRAM 10. The data bus 24 may be coupled to the processor bus 204 either directly (as shown), through the memory controller 230, or by some other means.

While the present invention has been described in connection with exemplary embodiments thereof, those of ordinary skill in the art will recognize that many modifications and variations are possible. Such modifications and variations are intended to be within the scope of the present invention, which is limited only by the following claims.

What is claimed is:

1. A circuit, comprising:
    a storage element for storing command and address information;
    a first counter responsive to a first clock for controlling the reading of said information out of said storage element;
    a second counter responsive to a second clock and said first counter;
    a first delay element responsive to said first counter and to said information read out of said storage element; and
    a second delay element responsive to said first delay element and said second counter.

2. The circuit of claim 1 wherein said first clock includes a burst data clock and said second clock includes a free running system clock.

3. The circuit of claim 2 wherein said information includes command and address information.

4. The circuit of claim 1 wherein said storage element includes a FIFO buffer and wherein said first and second delay elements include first and second latches, respectively.

5. A circuit, comprising:
    a storage element for storing command information; and
    a two stage pipeline for receiving command information from said storage element in response to a burst clock and for outputting said command information in response to a continuous clock.

6. The circuit of claim 5 wherein said storage element includes a storage element for storing command and address information, and wherein said two stage pipeline includes a two stage pipeline for receiving command and address information from said storage element and for outputting said command and address information.

7. The circuit of claim 5 wherein a first stage of said two stage pipeline includes a first counter responsive to said burst clock and a delay element responsive to said storage element and said first counter, and wherein a second stage of said two stage pipeline includes a second counter responsive to said continuous clock and said first counter, and a second delay element responsive to said first delay element and said second counter.

8. The circuit of claim 7 wherein said counters include double-edge clocked logic.

9. The circuit of claim 7 wherein said counters include counters that are enabled in response to a start signal.

10. An apparatus for coordinating the execution of commands with the receipt of data in a buffer in response to a burst clock, comprising:
    command capture logic for receiving command information in response to a system clock;
    a storage element responsive to said command capture logic for storing certain of said command information;
    a first counter responsive to said burst clock for controlling the reading of command information out of said storage element;
    a second counter responsive to said system clock and said first counter;
    a first delay element responsive to said first counter and to said storage element; and
    a second delay element responsive to said first delay element and said second counter for outputting said command information when data corresponding thereto is available.

11. The apparatus of claim 10 wherein said storage element includes a storage element for storing command and address information, and wherein said first counter is for controlling the reading of command and address information out of said storage element.

12. The apparatus of claim 10 wherein said counters include double-edge clocked logic.

13. The apparatus of claim 10 wherein said counters include counters that are enabled in response to a start signal.

14. An apparatus for coordinating the execution of commands with the receipt of data in a buffer in response to a burst clock, comprising:
    command capture logic for receiving command information in response to a system clock;
    a storage element responsive to said command capture logic for storing certain command information; and
    a multi-stage pipeline for receiving command information from said storage element in response to said burst clock and for outputting said command information in response to said system clock.

15. The apparatus of claim 14 wherein said storage element includes a storage element for storing comma)n(d and address information, and wherein said multi-stage pipeline includes a two stage pipeline for receiving command and address information from said storage element and for outputting said command and address information.

16. The apparatus of claim 14 wherein a first stage of said multi-stage pipeline includes a first counter responsive to said burst clock and a delay element responsive to said storage element and said first counter, and wherein a second stage of said multi-stage pipeline includes a second counter responsive to said system clock and said first counter, and a second delay element responsive to said first delay element and said second counter.

17. The apparatus of claim 16 wherein said counters include double-edge clocked logic.

18. The apparatus of claim 16 wherein said counters include counters that are enabled in response to a start signal.

19. A memory device, comprising:
a plurality of memory cells;
an address decoder for receiving address information and for identifying at least one specific memory cell responsive to said address;
a buffer for receiving data for write operations in accordance with a burst clock;
a read/write circuit for reading data out of said specific cell or for writing said received data into said specific cell;
a control circuit for receiving command information and for generating control signals in response thereto for controlling said address decoder and said read/write circuit;
said memory device further comprising an apparatus for coordinating the execution of commands with the receipt of data in said buffer, comprising:
command capture logic for receiving and examining command information in response to a system clock, certain of said command information being passed onto said control circuit
a storage element responsive to said command capture logic for storing certain other of said command information;
a first counter responsive to said burst clock for controlling the reading of command information out of said storage element;
a second counter responsive to said system clock and said first counter;
a first delay element responsive to said first counter and to said storage element; and
a second delay element responsive to said first delay element and said second counter for outputting said command information to said control circuit when data corresponding thereto is available.

20. The memory device of claim 19 wherein said storage element includes a storage element for storing command and address information, and wherein said first counter is for controlling the reading of command and address information out of said storage element, and wherein said second delay element outputs said address information to said address decoder.

21. The memory device of claim 19 wherein said counters include double-edge clocked logic.

22. The memory device of claim 19 wherein said counters include counters that are enabled in response to a start signal.

23. A memory device, comprising:
a plurality of memory cells;
an address decoder for receiving address information and for identifying at least one specific memory cell responsive to said address;
a buffer for receiving data for write operations in accordance with a burst clock;
a read/write circuit for reading data out of said specific cell or for writing said received data into said specific cell;
a control circuit for receiving command information and for generating control signals in response thereto for controlling said address decoder and said read/write circuit;
said memory device further comprising an apparatus for coordinating the execution of commands with the receipt of data in said buffer, comprising:
command capture logic for receiving and examining command information in response to a system clock, certain of said command information being passed onto said control circuit
a storage element responsive to said command capture logic for storing certain other of said command information; and
a multi-stage pipeline for receiving command information from said storage element in response to said burst clock and for outputting said command information to said control logic in response to said system clock.

24. The memory device of claim 23 wherein said storage element includes a storage element for storing command and address information, and wherein said multi-stage pipeline includes a two stage pipeline for receiving command and address information from said storage element and for outputting said address information to said address decoder.

25. The memory device of claim 23 wherein a first stage of said multi-stage pipeline includes a first counter responsive to said burst clock and a delay element responsive to said storage element and said first counter, and wherein a second stage of said multi-stage pipeline includes a second counter responsive to said system clock and said first counter, and a second delay element responsive to said first delay element and said second counter.

26. The memory device of claim 25 wherein said counters include double-edge clocked logic.

27. The memory device of claim 25 wherein said counters include counters that are enabled in response to a start signal.

28. A computer system, comprising:
a processor having a processor bus;
an input device coupled to the processor through the processor bus;
an output device coupled to the processor through the processor bus; and
a memory device coupled to the processor bus, said memory device comprising:
a plurality of memory cells;
an address decoder for receiving address information and for identifying at least one specific memory cell responsive to said address;
a buffer for receiving data for write operations in accordance with a burst clock;
a read/write circuit for reading data out of said specific cell or for writing said received data into said specific cell;
a control circuit for receiving command information and for generating control signals in response thereto for controlling said address decoder and said read/ write circuit;
command capture logic for receiving and examining command information in response to a system clock, certain of said command information being passed onto said control circuit
a storage element responsive to said command capture logic for storing certain other of said command information;

a first counter responsive to said burst clock for controlling the reading of command information out of said storage element;

a second counter responsive to said system clock and said first counter;

a first delay element responsive to said first counter and to said storage element; and a second delay element responsive to said first delay element and said second counter for outputting said command information to said control circuit when data corresponding thereto is available.

29. The computer system of claim 28 wherein said storage element includes a storage element for storing command and address information, and wherein said first counter is for controlling the reading of command and address information out of said storage element, and wherein said second delay element outputs said address information to said address decoder.

30. The computer system of claim 28 wherein said counters include double-edge clocked logic.

31. The computer system of claim 28 wherein said counters include counters that are enabled in response to a start signal.

32. A computer system, comprising:

a processor having a processor bus;

an input device coupled to the processor through the processor bus, an output device coupled to the processor through the processor bus; and a memory device coupled to the processor bus, said memory device comprising:

a plurality of memory cells;

an address decoder for receiving address information and for identifying at least one specific memory cell responsive to said address;

a buffer for receiving data for write operations in accordance with a burst clock;

a read/write circuit for reading data out of said specific cell or for writing said received data into said specific cell;

a control circuit for receiving command information and for generating control signals in response thereto for controlling said address decoder and said read/write circuit;

command capture logic for receiving and examining command information in response to a system clock, certain of said command information being passed onto said control circuit a storage element responsive to said command capture logic for storing certain other of said command information; and a two stage pipeline for receiving command information from said storage element in response to said burst clock and for outputting said command information to said control logic in response to said system clock.

33. The computer system of claim 32 wherein said storage element includes a storage element for storing command and address information, and wherein said two stage pipeline includes a two stage pipeline for receiving command and address information from said storage element and for outputting said address information to said address decoder.

34. The computer system of claim 32 wherein a first stage of said two stage pipeline includes a first counter responsive to said burst clock and a delay element responsive to said storage element and said first counter, and wherein a second stage of said two stage pipeline includes a second counter responsive to said system clock and said first counter, and a second delay element responsive to said first delay element and said second counter.

35. The computer system of claim 34 wherein said counters include double-edge clocked logic.

36. The computer system of claim 34 wherein said counters include counters that are enabled in response to a start signal.

37. A method, comprising:

storing information;

transferring said stored information to a first device in response to a burst clock; and transferring said information from said first device to a second device in response to a continuous clock.

38. The method of claim 37 wherein said step of storing information includes the step of storing command and address information and wherein said two transferring steps include transferring said command and address information.

39. A method, comprising:

storing information;

inputting said stored information into a pipeline in response to a burst clock; and outputting said stored information from said pipeline in response to a continuous clock.

40. The method of claim 39 wherein said step of storing information includes the step of storing command and address information and wherein said inputting and outputting steps include inputting and outputting said command and address information.

41. A method, comprising:

storing information;

counting the clock pulses of a burst clock to produce a burst clock count;

transferring said stored information to a first device in response to said burst clock count;

counting the clock pulses of a continuous clock in response to said burst clock count to produce a continuous clock count; and transferring said information from said first device to a second device in response to said continuous clock count.

42. The method of claim 41 wherein said step of storing information includes the step of storing command and address information and wherein said two transferring steps include transferring said command and address information.

43. The method of claim 41 wherein said step of counting the clock pulses of a burst clock includes counting both the rising and falling edges of said burst clock and wherein said step of counting the clock pulses of a continuous clock includes counting both the rising and falling edges of said continuous clock.

44. A method of coordinating the execution of commands with the receipt of data in response to a burst clock, comprising:

receiving command information in response to a continuous clock;

storing certain of said command information;

transferring said stored command information to a first device in response to said burst clock; and transferring said command information from said first de%ice to a second device in response to said continuous clock.

45. The method of claim 44 wherein said step of storing information includes the step of storing command and address information and wherein said two transferring steps include transferring said command and address information.

46. A method of coordinating the execution of commands with the receipt of data in response to a burst clock; comprising:

receiving command information in response to a continuous clock;

storing certain of said command information;

inputting said stored command information into a pipeline in response to a burst clock; and outputting said stored command information from said pipeline in response to said continuous clock.

47. The method of claim 46 wherein said step of storing information includes the step of storing command and address information and wherein said inputting and outputting steps include inputting and outputting said command and address information.

48. A method of coordinating the execution of commands with the receipt of data in response to a burst clock; comprising:

receiving command information in response to a continuous clock;

storing certain of said command information;

counting the clock pulses of said burst clock to produce a burst clock count;

transferring said stored command information to a first device in response to said burst clock count;

counting the clock pulses of said continuous clock in response to said burst clock count to produce a continuous clock count; and transferring said command information from said first device to a second device in response to said continuous clock count.

49. The method of claim 48 wherein said step of storing information includes the step of storing command and address information and wherein said two transferring steps include transferring said command and address information.

50. The method of claim 48 wherein said step of counting the clock pulses of said burst clock includes counting both the rising and falling edges of said burst clock and wherein said step of counting the clock pulses of said continuous clock includes counting both the rising and falling edges of said continuous clock.

51. A method of processing a write command associated with an address and data, comprising:

receiving a write command and an address in response to a continuous clock;

receiving data in response to a burst clock; and postponing the execution of said received write command until said data associated therewith is received, said write command being executed on said address in response to said continuous clock.

* * * * *

UNITED STATES PATENT AND TRADEMARK OFFICE
CERTIFICATE OF CORRECTION

PATENT NO. : 6,751,717 B2
DATED : June 15, 2004
INVENTOR(S) : Johnson

It is certified that error appears in the above-identified patent and that said Letters Patent is hereby corrected as shown below:

Column 1,
Line 40, delete "it' and insert therefore -- if --.
Line 62, delete "bother" and insert therefore -- further --.

Column 2,
Line 9, insert a period following "clock".
Line 11, insert a period and a space following "Memory".

Column 3,
Line 47, delete "if" and insert therefore -- in --.
Line 49, delete "t synchronous" and insert therefore -- a synchronous --.
Line 62, delete "connect" and insert therefore -- connected --.
Line 65, delete "to", first occurrence.

Column 4,
Line 15, delete "(CKL)" and insert therefore -- (CKE) --.
Line 27, insert a period following "23".

Column 5,
Line 57, delete "rests" and insert therefore -- resets --.

Column 6,
Line 54, delete "(FIG. 41)" and insert therefore -- FIG. 41 --.
Line 60, delete "44" and insert therefore -- 41 --.
Line 67, insert a period following "32".

Column 8,
Line 9, following "a" and before "delay" insert -- first --.
Line 60, delete "comma)n(d" and insert therefore -- command --.
Line 67, following "a" and before "delay", insert -- first --.

Column 9,
Line 30, insert a semi-colon following "circuit".

UNITED STATES PATENT AND TRADEMARK OFFICE
CERTIFICATE OF CORRECTION

PATENT NO. : 6,751,717 B2
DATED : June 15, 2004
INVENTOR(S) : Johnson

It is certified that error appears in the above-identified patent and that said Letters Patent is hereby corrected as shown below:

Column 10,
Line 11 and 64, insert a semi-colon following "circuit".
Line 18, delete "logic" and insert therefore -- circuit --.

Column 11,
Line 27, delete the comma and insert a semi-colon in its place.
Line 48, insert a semi-colon following "circuit".
Line 55, delete "logic" and insert therefore -- circuit --.
Line 65, following "a" and before "delay" insert -- first --.

Column 12,
Lines 63-64, delete "de%ice" and insert therefore -- device --.

Column 13,
Line 4 and 20, delete the semi-colon and insert a comma in its place.

Signed and Sealed this

Twelfth Day of October, 2004

JON W. DUDAS
*Director of the United States Patent and Trademark Office*